(12) United States Patent
Tsujiya et al.

(10) Patent No.: US 11,054,397 B2
(45) Date of Patent: Jul. 6, 2021

(54) PROPAGATION TIME MEASUREMENT MACHINE, GAS CONCENTRATION MEASUREMENT DEVICE, PROPAGATION TIME MEASUREMENT PROGRAM, AND PROPAGATION TIME MEASUREMENT METHOD

(71) Applicants: UEDA JAPAN RADIO CO., LTD., Ueda (JP); JAPAN RADIO CO., LTD., Tokyo (JP); NISSHINBO HOLDINGS INC., Tokyo (JP)

(72) Inventors: Kouichi Tsujiya, Ueda (JP); Yoshifumi Shinfuku, Tokyo (JP); Yasuhiro Toriyama, Tokyo (JP)

(73) Assignees: Ueda Japan Radio Co., Ltd., Ueda (JP); JAPAN RADIO CO., LTD., Tokyo (JP); Nisshinbo Holdings Inc., Tokyo (JP)

( * ) Notice: Subject to any disclaimer, the term of this patent is extended or adjusted under 35 U.S.C. 154(b) by 0 days.

(21) Appl. No.: 16/651,547

(22) PCT Filed: Sep. 28, 2018

(86) PCT No.: PCT/JP2018/036246
§ 371 (c)(1),
(2) Date: Mar. 27, 2020

(87) PCT Pub. No.: WO2019/069804
PCT Pub. Date: Apr. 11, 2019

(65) Prior Publication Data
US 2020/0264136 A1    Aug. 20, 2020

(30) Foreign Application Priority Data
Oct. 4, 2017    (JP) .............................. JP2017-194408

(51) Int. Cl.
*G01N 29/024*    (2006.01)
*G01N 29/38*    (2006.01)
*G01N 29/50*    (2006.01)

(52) U.S. Cl.
CPC ........... *G01N 29/024* (2013.01); *G01N 29/38* (2013.01); *G01N 29/50* (2013.01); *G01N 2291/044* (2013.01)

(58) Field of Classification Search
CPC ...... G01N 29/024; G01N 29/38; G01N 29/44; G01N 29/50; G01N 29/326; G01N 29/341;
(Continued)

(56) References Cited

U.S. PATENT DOCUMENTS 4,787,252 A    11/1988    Jacobson et al.
5,060,514 A    10/1991    Aylsworth
(Continued)

FOREIGN PATENT DOCUMENTS

EP    1020723 A2    7/2000
JP    S53-34587 A    3/1978
(Continued)

OTHER PUBLICATIONS

International Search Report for International Application No. PCT/JP2018/036246, dated Dec. 18, 2018.
(Continued)

*Primary Examiner* — Suman K Nath
(74) *Attorney, Agent, or Firm* — Jason H. Vick; Sheridan Ross, PC

(57) ABSTRACT

A processor is configured to include a correlation object determination unit for establishing: a first to-be-correlated signal established on the basis of a first upper-limit rate of change, which is the rate of change of an upper-limit envelope of a direct wave signal, and a first lower-limit rate
(Continued)

of change, which is the rate of change of a lower-limit envelope of the direct wave signal; and a second to-be-correlated signal established on the basis of a second upper-limit rate of change, which is the rate of change of an upper-limit envelope of a round-trip-delayed wave signal, and a second lower-limit rate of change, which is the rate of change of a lower-limit envelope of the round-trip-delayed wave signal. The processor is also configured to include a correlation processing unit for establishing a correlation value between the first to-be-correlated signal and a signal based on the second to-be-correlated signal.

7 Claims, 11 Drawing Sheets

(58) Field of Classification Search
CPC .. G01N 29/343; G01N 29/346; G01N 29/449; G01N 2291/044; G01N 2291/011; G01N 2291/021; G01N 2291/0212; G01N 2291/02809; G01N 2291/102; G01N 2291/103; G01M 3/24; G01S 7/539; G01S 7/5273
See application file for complete search history.

(56) References Cited

U.S. PATENT DOCUMENTS

| | | | |
|---|---|---|---|
| 5,313,820 A | 5/1994 | Aylsworth | |
| 5,369,979 A | 12/1994 | Aylsworth et al. | |
| 5,452,621 A | 9/1995 | Aylesworth et al. | |
| 5,671,154 A | 9/1997 | Iizuka et al. | |
| 6,418,782 B1 * | 7/2002 | Sato | G01N 29/024 73/24.01 |
| 7,574,894 B2 * | 8/2009 | Austerlitz | G01N 29/024 73/24.01 |
| 8,834,376 B2 | 9/2014 | Stergiopoulos et al. | |
| 2003/0136193 A1 | 7/2003 | Fujimoto | |
| 2017/0138773 A1 | 5/2017 | D'Souza-Matthew et al. | |

FOREIGN PATENT DOCUMENTS

| | | |
|---|---|---|
| JP | S60-138422 A | 7/1985 |
| JP | H1-193617 A | 8/1989 |
| JP | H3-223669 A | 10/1991 |
| JP | H5-346421 A | 12/1993 |
| JP | H6-58751 A | 3/1994 |
| JP | 2000-249691 A | 9/2000 |
| JP | 2002-214203 A | 7/2002 |
| JP | 2005-337848 A | 12/2005 |
| JP | 2012-042449 A | 3/2012 |

OTHER PUBLICATIONS

Written Opinion for International Application No. PCT/JP2018/036246, dated Dec. 18, 2018.
European Search Report for European Application No. 18865304.2, dated Jan. 27, 2021.
International Preliminary Report on Patentability for International Application No. PCT/JP2018/036246, dated Apr. 16, 2020.

* cited by examiner

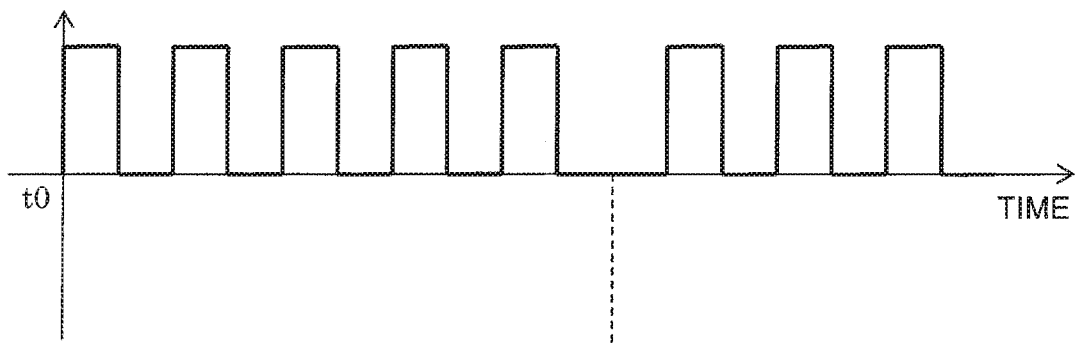
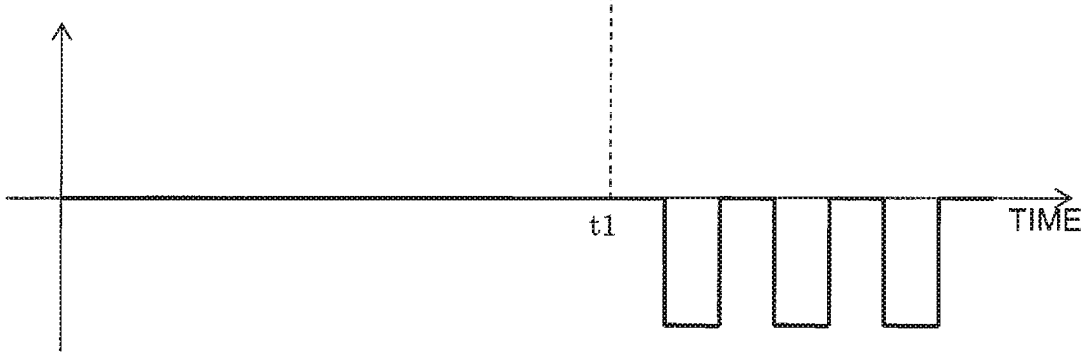
FIG. 10

PROPAGATION TIME MEASUREMENT MACHINE, GAS CONCENTRATION MEASUREMENT DEVICE, PROPAGATION TIME MEASUREMENT PROGRAM, AND PROPAGATION TIME MEASUREMENT METHOD

CROSS REFERENCE TO RELATED APPLICATIONS

This application is a National Phase Application under 35 U.S.C. 371 of PCT Application No. PCT/JP2018/036246 having an international filing date of 28 Sep. 2018 which designated the United States, which PCT application claimed the benefit of Japanese Patent Application No. 2017-194408 filed 4 Oct. 2017, each of which are incorporated herein by reference in their entirety.

TECHNICAL FIELD

The present invention generally relates to a propagation time measurement machine, a gas concentration measurement device, a propagation time measurement program, and a propagation time measurement method, and more particular to a technique for obtaining a time required for ultrasonic waves to propagate in a measurement space.

BACKGROUND

Research and development have been broadly conducted on fuel cell vehicles traveling with electric power to be supplied from a fuel cell. The fuel cell generates electric power through a chemical reaction between hydrogen and oxygen. Typically, hydrogen is supplied as fuel to the fuel cell, and oxygen is taken into the fuel cell from ambient air. The fuel cell vehicles are equipped with a hydrogen tank, and hydrogen is supplied from the hydrogen tank to the fuel cell. When the amount of hydrogen within the hydrogen tank becomes smaller, hydrogen is supplied to the hydrogen tank in the fuel cell vehicle from a hydrogen supply device installed at a service station.

Since hydrogen is a flammable gas, it is necessary to monitor leakage of hydrogen from the fuel cell vehicle and the hydrogen supply device. Therefore, a hydrogen concentration measurement device has been widely used together with the fuel cell vehicle and the hydrogen supply device. The hydrogen concentration measurement device has a function of measuring a concentration of hydrogen contained in air and issuing an alarm when the concentration of hydrogen exceeds a predetermined value.

The following Patent literatures 1 and 2 disclose devices for measuring a concentration of a specified gas. The devices disclosed in the patent literatures measure the concentration of the specified gas based on propagation characteristics of ultrasonic waves, such as a propagation speed of the ultrasonic waves in air to be measured, and may be used for measuring the concentration of hydrogen. In addition, Patent Literatures 3 and 4 disclose techniques, as a technique related to the present invention, for obtaining a time interval between adjacent pulses by obtaining a correlation value between adjacent pulses for a multiple reflection echo received when ultrasonic waves are transmitted.

CITATION LIST

Patent Literature

Patent Literature 1: JP 2002-214203 A
Patent Literature 2: JP 3-223669 A
Patent Literature 3: JP 5-346421 A
Patent Literature 4: JP 6-58751 A

SUMMARY

Technical Problem

In general, a device for measuring a concentration of a specified gas based on a propagation speed of ultrasonic waves includes a space where the concentration of the gas is measured. In such a concentration measurement space, ultrasonic transducers for transmitting and receiving ultrasonic waves are provided. The propagation speed of the ultrasonic waves is obtained based on the propagation time, which is a time required for the ultrasonic waves to propagate in the concentration measurement space, and the propagation distance obtained in advance. An example of a method of measuring the propagation time is as follows. The propagation time is measured based on a difference between a reception time of first ultrasonic waves that are transmitted into the concentration measurement space and directly reach an ultrasonic transducer for reception and a reception time of second ultrasonic waves that are transmitted into the concentration measurement space, reflected back to an ultrasonic transducer for transmission by being reflected by the ultrasonic transducer for reception, and reach the ultrasonic transducer for reception again.

However, when the time waveforms of the first ultrasonic pulse and the second ultrasonic pulse are time waveforms not having characteristics such as a constant amplitude, the difference between the reception time of the first ultrasonic pulse and the reception time of the second ultrasonic pulse may be difficult to measure. In this case, the measurement accuracy of the propagation time of the ultrasonic waves propagating in the concentration measurement space may be reduced, and the measurement accuracy of the gas concentration may be reduced.

It is an advantage of the present invention to improve measurement accuracy of a propagation time of ultrasonic waves.

Solution to Problem

The present invention is to provide a propagation time measurement machine including: a reception unit that receives ultrasonic waves; and a computation unit that obtains a time required for the ultrasonic waves to propagate in a measurement space, based on a first reception signal output from the reception unit based on first ultrasonic waves received by the reception unit and a second reception signal output subsequent to the first ultrasonic waves from the reception unit based on second ultrasonic waves received by the reception unit, the computation unit including: a correlation object determination unit that obtains a first correlation object signal obtained based on a first upper-limit rate of change, which is a rate of change of an upper-limit envelope of the first reception signal, and a first lower-limit rate of change, which is a rate of change of a lower-limit envelope of the first reception signal, and a second correlation object signal obtained based on a second upper-limit rate of change, which is a rate of change of an upper-limit envelope of the second reception signal, and a second lower-limit rate of change, which is a rate of change of a lower-limit envelope of the second reception signal; a correlation processing unit that obtains a correlation value between the first correlation object signal and a signal obtained by moving the second correlation object signal on a time axis; and a propagation time measurement unit that obtains a time difference between the first correlation object signal and the second correlation object signal based on the correlation value and obtains the time required for the ultrasonic waves to propagate in the measurement space, based on the time difference.

Preferably, the correlation object determination unit is configured to: obtain a difference between maximum values adjacent to each other on the time axis to obtain the discrete first upper-limit rate of change arranged in time series and the discrete second upper-limit rate of change arranged in time series; obtain a difference between minimum values adjacent to each other on the time axis to obtain the discrete first lower-limit rate of change arranged in time series and the discrete second lower-limit rate of change arranged in time series; arrange, in time-series order, the discrete first upper-limit rate of change arranged in time series and the discrete first lower-limit rate of change arranged in time series to obtain the first correlation object signal; and arrange, in time-series order, the discrete second upper-limit rate of change arranged in time series and the discrete second lower-limit rate of change arranged in time series to obtain the second correlation object signal.

Preferably, a concentration measurement unit is provided to measure a concentration of a specific gas in the measurement space, based on the time required for the ultrasonic waves to propagate in the measurement space.

In addition, the present invention is to provide a propagation time measurement program to be read by a propagation time measurement machine including: a reception unit that receives ultrasonic waves; and a computation unit that obtains a time required for the ultrasonic waves to propagate in a measurement space, based on a first reception signal output from the reception unit based on first ultrasonic waves received by the reception unit and a second reception signal output subsequent to the first ultrasonic waves from the reception unit based on second ultrasonic waves received by the reception unit, the propagation time measurement program causing the computation unit to execute processing of: correlation object determination processing for obtaining a first correlation object signal obtained based on a first upper-limit rate of change, which is a rate of change of an upper-limit envelope of the first reception signal, and a first lower-limit rate of change, which is a rate of change of a lower-limit envelope of the first reception signal, and a second correlation object signal obtained based on a second upper-limit rate of change, which is a rate of change of an upper-limit envelope of the second reception signal, and a second lower-limit rate of change, which is a rate of change of a lower-limit envelope of the second reception signal; correlation processing for obtaining a correlation value between the first correlation object signal and a signal obtained by moving the second correlation object signal on a time axis; and propagation time measurement processing for obtaining a time difference between the first correlation object signal and the second correlation object signal based on the correlation value and obtaining the time required for the ultrasonic waves to propagate in the measurement space, based on the time difference.

Preferably, the correlation object determination processing includes: processing for obtaining a difference between maximum values adjacent to each other on the time axis to obtain the discrete first upper-limit rate of change arranged in time series and the discrete second upper-limit rate of change arranged in time series; processing for obtaining a difference between minimum values adjacent to each other on the time axis to obtain the discrete first lower-limit rate of change arranged in time series and the discrete second lower-limit rate of change arranged in time series; processing for arranging, in time-series order, the discrete first upper-limit rate of change arranged in time series and the discrete first lower-limit rate of change arranged in time series to obtain the first correlation object signal; and processing for arranging, in time-series order, the discrete second upper-limit rate of change arranged in time series and the discrete second lower-limit rate of change arranged in time series to obtain the second correlation object signal.

In addition, the present invention is to provide a propagation time measurement method to be executed by a propagation time measurement machine including: a reception unit that receives ultrasonic waves; and a computation unit that obtains a time required for the ultrasonic waves to propagate in a measurement space, based on a first reception signal output from the reception unit based on first ultrasonic waves received by the reception unit and a second reception signal output subsequent to the first ultrasonic waves from the reception unit based on second ultrasonic waves received by the reception unit, the propagation time measurement method causing the computation unit to execute processing of: correlation object determination processing for obtaining a first correlation object signal obtained based on a first upper-limit rate of change, which is a rate of change of an upper-limit envelope of the first reception signal, and a first lower-limit rate of change, which is a rate of change of a lower-limit envelope of the first reception signal, and a second correlation object signal obtained based on a second upper-limit rate of change, which is a rate of change of an upper-limit envelope of the second reception signal, and a second lower-limit rate of change, which is a rate of change of a lower-limit envelope of the second reception signal; correlation processing for obtaining a correlation value between the first correlation object signal and a signal obtained by moving the second correlation object signal on a time axis; and propagation time measurement processing for obtaining a time difference between the first correlation object signal and the second correlation object signal based on the correlation value and obtaining the time required for the ultrasonic waves to propagate in the measurement space, based on the time difference.

Preferably, the correlation object determination processing includes: processing for obtaining a difference between maximum values adjacent to each other on the time axis to obtain the discrete first upper-limit rate of change arranged in time series and the discrete second upper-limit rate of change arranged in time series; processing for obtaining a difference between minimum values adjacent to each other on the time axis to obtain the discrete first lower-limit rate of change arranged in time series and the discrete second lower-limit rate of change arranged in time series; processing for arranging, in time-series order, the discrete first upper-limit rate of change arranged in time series and the discrete first lower-limit rate of change arranged in time series to obtain the first correlation object signal; and processing for arranging, in time-series order, the discrete second upper-limit rate of change arranged in time series and the discrete second lower-limit rate of change arranged in time series to obtain the second correlation object signal.

Advantageous Effects of Invention

According to the present invention, it is possible to improve measurement accuracy of a propagation time of ultrasonic waves.

BRIEF DESCRIPTION OF DRAWINGS

FIG. 10 is a diagram illustrating an example of a transmission pulse signal generated in a transmission circuit.

DESCRIPTION OF EMBODIMENTS

Figure 1:
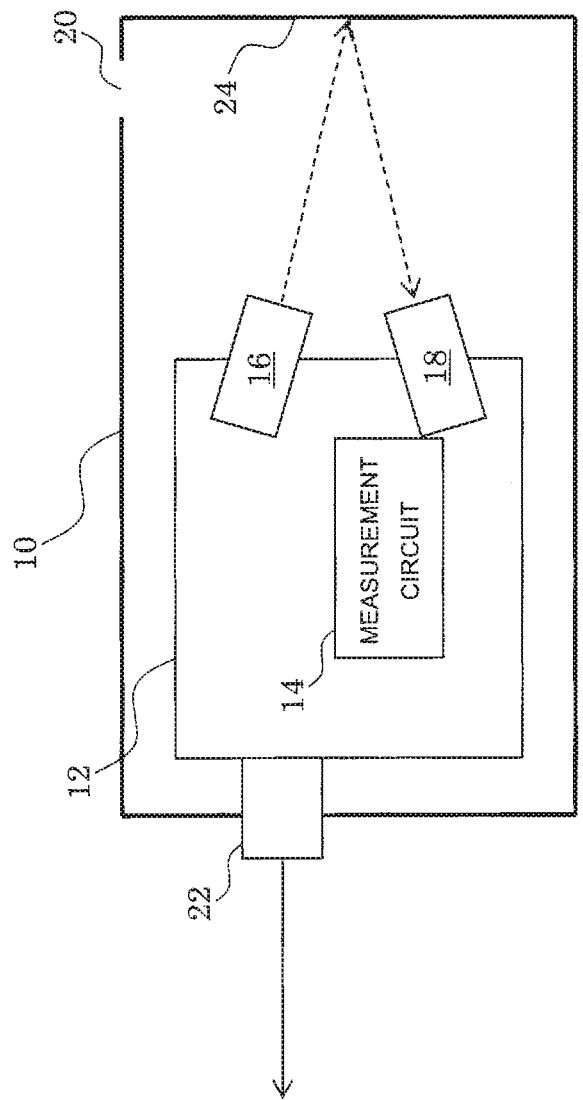
FIG. 1 is a diagram schematically illustrating a gas concentration measurement device.

FIG. 1 schematically illustrates a gas concentration measurement device according to an embodiment of the present invention. The gas concentration measurement device includes a housing 10 having a space in which a gas concentration is measured, and measures the gas concentration based on a propagation speed of ultrasonic waves propagating through a gas in the housing 10. The housing 10 is provided with a vent hole 20, and the gas circulates inside and outside the housing 10 through the vent hole 20. A shape of the concentration measurement space in the housing 10 is, for example, a rectangular parallelepiped shape or a cylindrical shape. The concentration measurement space does not necessarily have to be surrounded in all directions by a wall of the housing 10, and may be a space in which ultrasonic waves can be transmitted and received.

The gas concentration measurement device includes a circuit board 12 housed in the housing 10. On the circuit board 12, a measurement circuit 14, a transmission transducer 16, a reception transducer 18, and a connector 22 are mounted. The transmission transducer 16 transmits ultrasonic waves based on an operation of the measurement circuit 14. The reception transducer 18 receives the ultrasonic waves propagated in the housing 10. The measurement circuit 14 obtains a propagation time required for the ultrasonic waves to propagate over a distance from the transmission transducer 16 to the reception transducer 18 through a reflecting surface 24 on an inner surface of the housing 10, based on a difference between a time at which direct waves are received by the reception transducer 18 and a time at which one round-trip delay waves are received by the reception transducer 18. Here, the direct waves are ultrasonic waves that are transmitted from the transmission transducer 16 and reach the reception transducer 18 by reflection on the reflecting surface 24. Further, the one round-trip delay waves are ultrasonic waves that are transmitted from the transmission transducer 16 and reach the reception transducer 18 by reflection on the reflecting surface 24, and further reach the reception transducer 18 again by reflection on the reception transducer 18, the reflecting surface 24, the transmission transducer 16, and the reflecting surface 24, in this order. The measurement circuit 14 obtains a propagation speed of the ultrasonic waves based on the propagation time obtained in this manner and a propagation distance stored in advance.

The measurement circuit 14 measures a temperature inside the housing 10 based on a value detected by a temperature sensor provided therein, and further obtains a gas concentration based on the propagation speed of the ultrasonic waves and the measured temperature value. The measurement circuit 14 outputs the gas concentration measurement value to, for example, a computer and a display device which are external devices and are connected to the connector 22.

Figure 2:
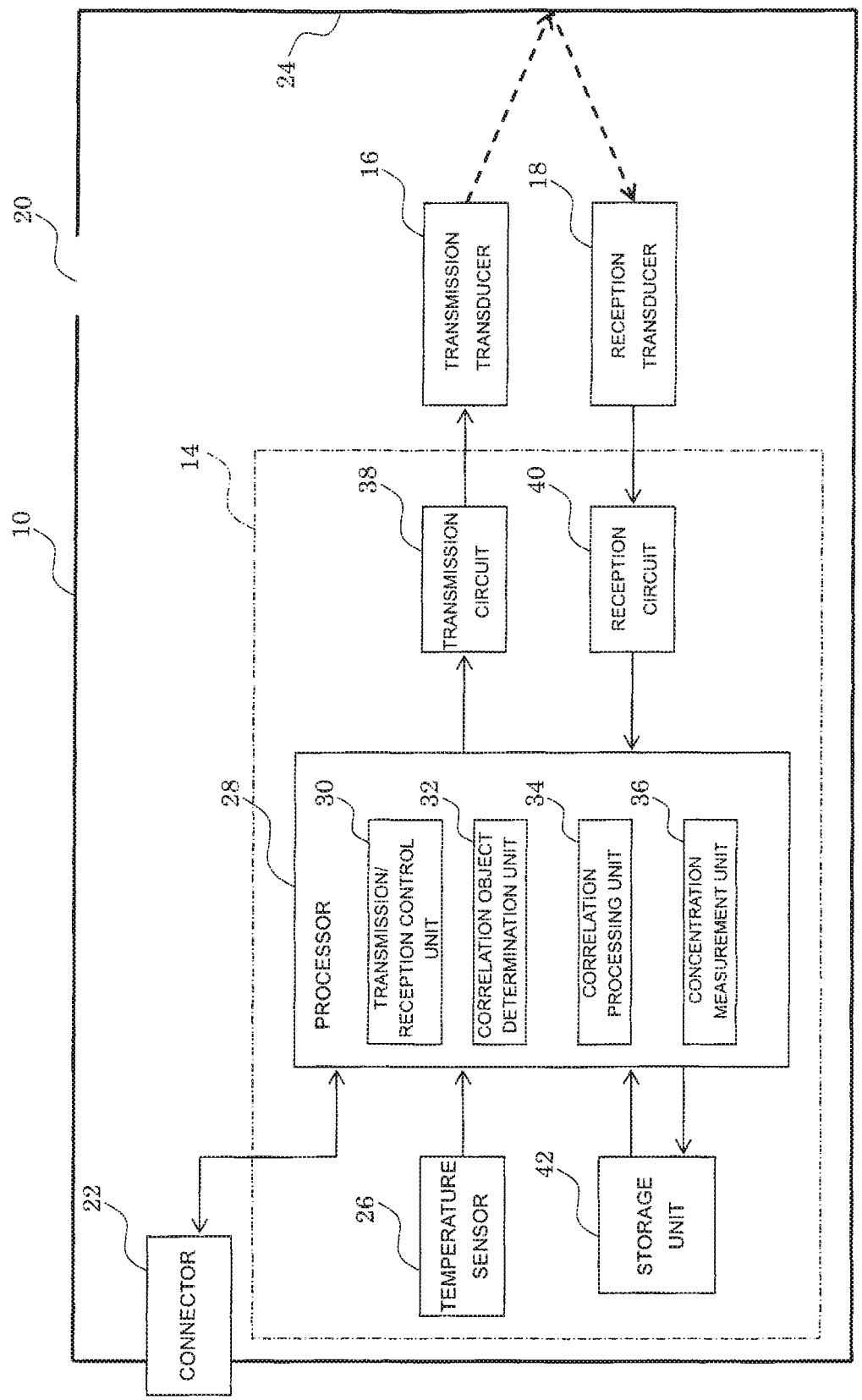
FIG. 2 is a diagram illustrating a detailed configuration of the gas concentration measurement device.

FIG. 2 illustrates a detailed configuration of the gas concentration measurement device according to the embodiment of the present invention. The gas concentration measurement device includes the housing 10, the transmission transducer 16, the reception transducer 18, the measurement circuit 14, and the connector 22. The measurement circuit 14 includes a transmission circuit 38, a reception circuit 40, a temperature sensor 26, a processor 28, and a storage unit 42. The transmission transducer 16, the reception transducer 18, and the connector 22 are connected to the measurement circuit 14.

The processor 28 serving as a computation unit executes a program stored therein in advance, or a program stored in the storage unit 42, and thus includes a transmission/reception control unit 30, a correlation object determination unit 32, a correlation processing unit 34, and a concentration measurement unit 36. These components may be individually configured by digital circuits, which is hardware, instead of being realized by the processor 28.

A description will be given with respect to a process in which the gas concentration measurement device measures a hydrogen concentration. The transmission circuit 38 and the transmission transducer 16 operate as a transmission unit that transmits ultrasonic waves. The transmission circuit 38 outputs a transmission pulse signal to the transmission transducer 16 under control of the transmission/reception control unit 30. The transmission transducer 16 converts the transmission pulse signal, which is an electric signal, into ultrasonic waves, and transmits an ultrasonic transmission pulse. The ultrasonic transmission pulse is reflected by the reflecting surface 24 of the housing 10 and reaches the reception transducer 18.

Some of the direct waves reaching the reception transducer 18 are reflected on the reception transducer 18, the reflecting surface 24, the transmission transducer 16, and the reflecting surface 24, in this order, and thus reach the reception transducer 18 again. The ultrasonic waves arriving at the reception transducer 18 include N round-trip delay waves (N is an integer of 2 or more) in addition to the direct waves and the one round-trip delay waves. The N round-trip delay waves are ultrasonic waves that are received by the reception transducer 18 after propagating N times along a round-trip route in which the ultrasonic waves return to the reception transducer 18 by reflection on the reception transducer 18 and reflection on the reflecting surface 24, the transmission transducer 16, and the reflecting surface 24.

The reception transducer 18 and the reception circuit 40 operate as a reception unit that receives ultrasonic waves. The reception transducer 18 receives the ultrasonic waves, converts the received ultrasonic waves into a reception signal which is an electrical signal, and outputs the signal to the reception circuit 40. The reception circuit 40 adjusts a level of the reception signal, and outputs the adjusted signal to the processor 28. The processor 28 stores reception data representing the reception signal in the storage unit 42. The reception data is data in which a value of a reception pulse signal is associated with a time. The reception data stored in the storage unit 42 is appropriately read out by the processor 28 in processing to be executed by the processor 28.

The reception signal includes a direct wave signal based on the direct waves, a one round-trip delay wave signal based on the one round-trip delay waves, and an N round-trip delay signal based on the N round-trip delay waves. A description will be given below with respect to a process of obtaining a propagation time required for the ultrasonic waves to propagate over the distance from the transmission transducer 16 to the reception transducer 18 through the reflecting surface 24, using the direct wave signal and the one round-trip delay wave signal.

Figure 3:
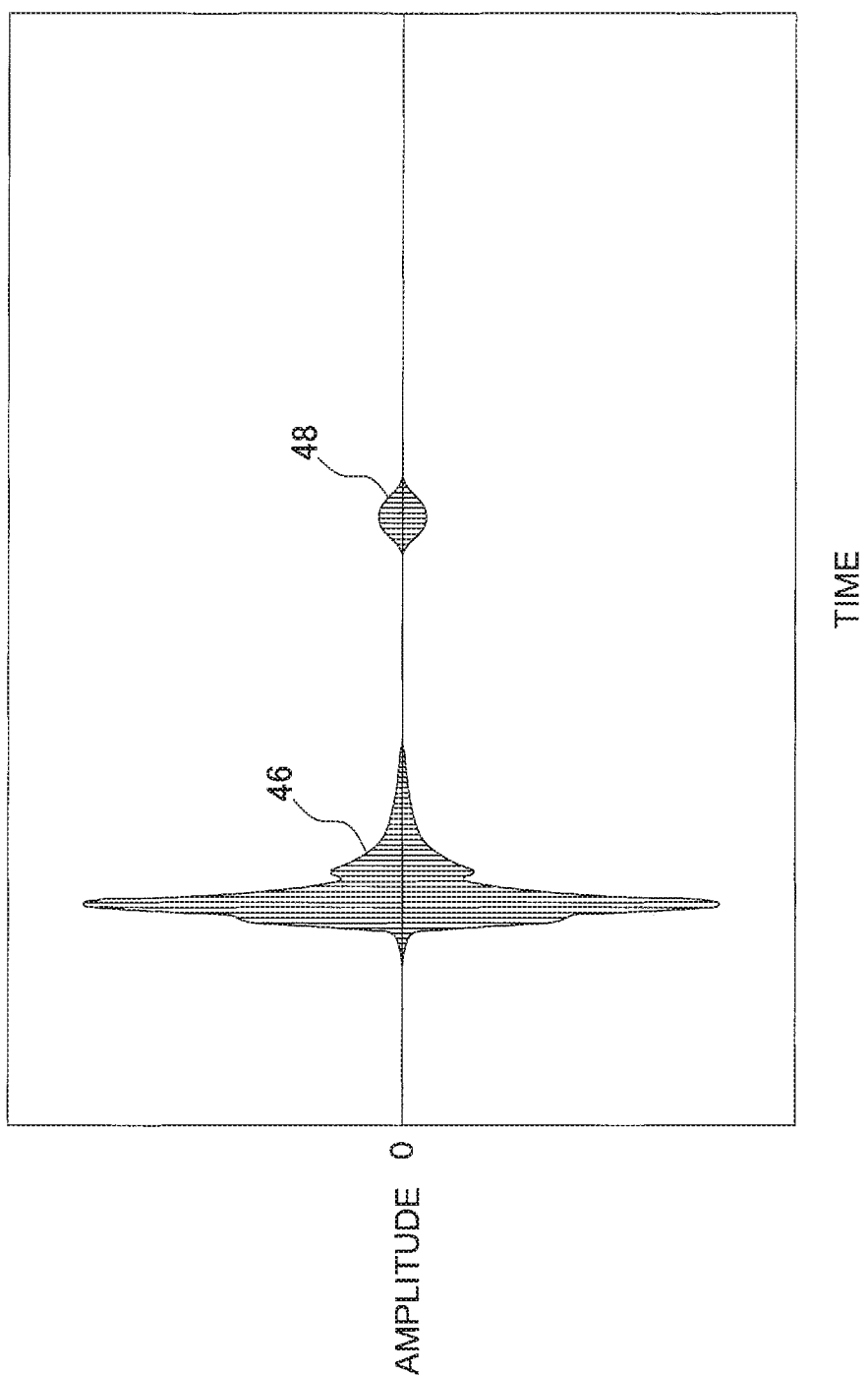
FIG. 3 is a diagram illustrating examples of time waveforms of a direct wave signal and one round-trip delay wave signal.
Figure 4:
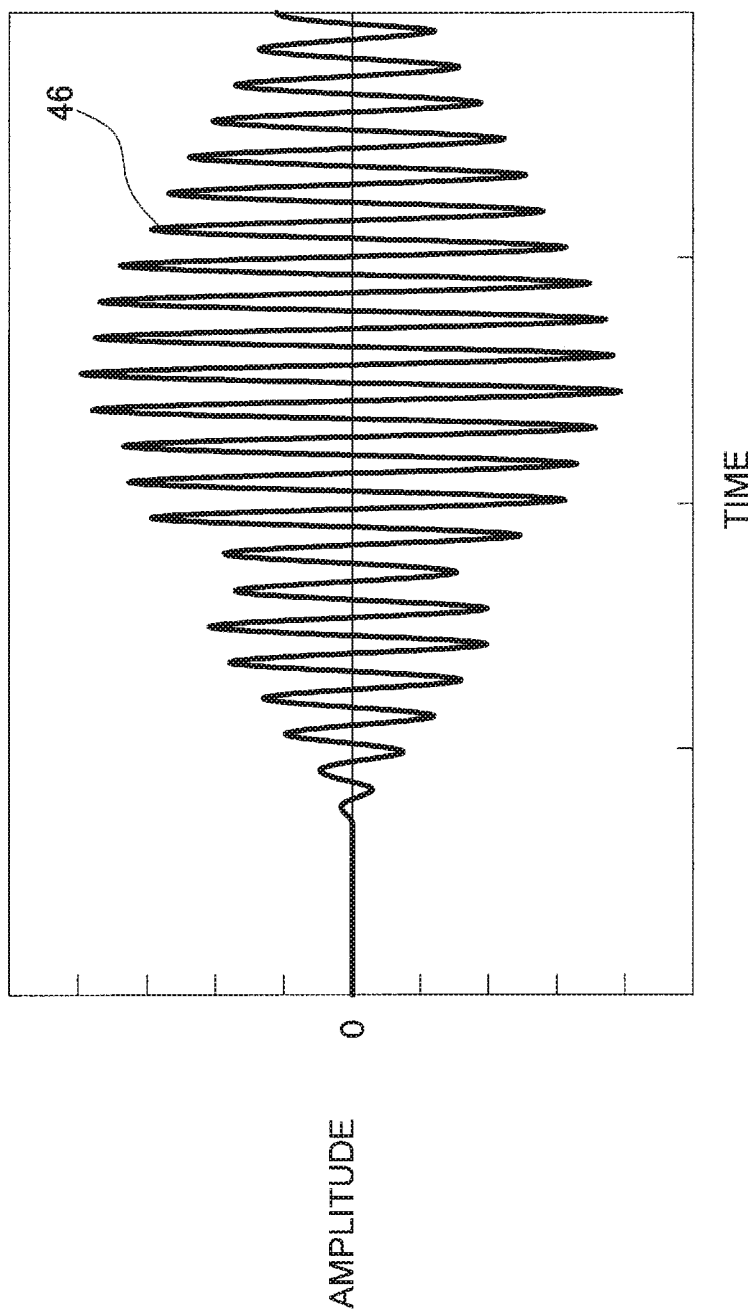
FIG. 4 is a diagram illustrating the time waveforms of the direct wave signal.

FIG. 3 illustrates an example of time waveforms of the direct wave signal and the one round-trip delay wave signal. A horizontal axis indicates time, and a vertical axis indicates amplitude. In the example illustrated in FIG. 3, the amplitude of the direct wave signal 46 is larger than the amplitude of the one round-trip delay wave signal 48, and the one round-trip delay wave signal 48 is output from the reception circuit 40 to the processor 28 later than the direct wave signal 46. FIG. 4 illustrates time waveforms of the direct wave signal in a state where the scales of the vertical axis and the horizontal axis are changed. The one round-trip delay wave signal has a size different from that of the direct wave signal, but has time waveforms similar to the time waveforms of the direct wave signal.

The correlation object determination unit 32 obtains a differential waveform of an upper-limit envelope connecting maximum points of the time waveforms of the direct wave signal, as a first upper-limit rate of change. In addition, the correlation object determination unit 32 obtains a differential waveform of a lower-limit envelope connecting minimum points of the time waveforms of the direct wave signal, as a first lower-limit rate of change. Further, the correlation object determination unit 32 obtains a first correlation object signal, which is a signal for obtaining a time difference between the direct wave signal and the one round-trip delay wave signal, based on the first upper-limit rate of change and the first lower-limit rate of change. However, such processing is executed on discrete values, as will be described below.

Figure 5:
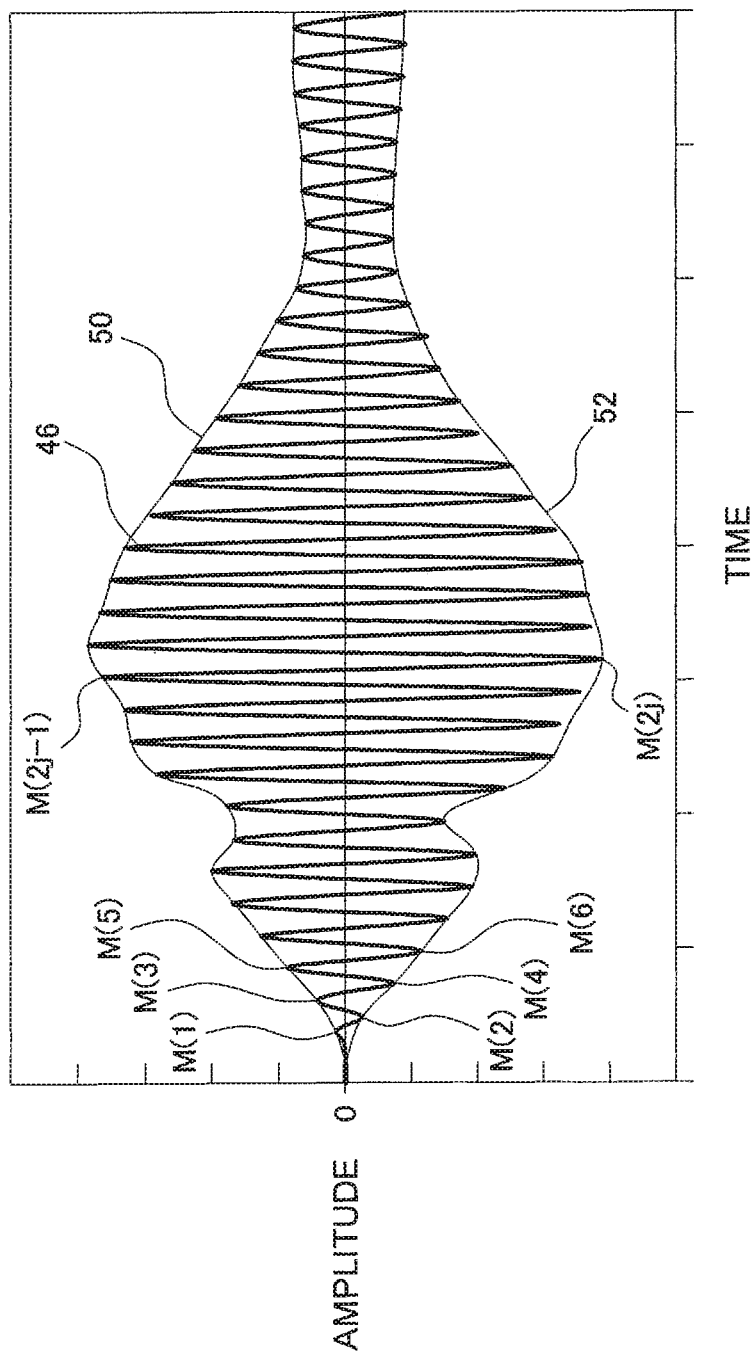
FIG. 5 is a diagram illustrating a direct wave signal, an upper-limit envelope, and a lower-limit envelope.

FIG. 5 illustrates a direct wave signal 46, an upper-limit envelope 50, and a lower-limit envelope 52. The upper-limit envelope 50 is a time waveform in which maximum points $M(1), M(3), M(5), \ldots, M(2j-1), \ldots$ are interpolated. Here, j is an integer. The lower-limit envelope 52 is a time waveform in which minimum points $M(2), M(4), M(6), \ldots, M(2j), \ldots$ are interpolated. In other words, the maximum point is indicated by a code with an odd number affixed to the right of the code "M", and the minimum point is indicated by a code with an even number affixed to the right of the code "M".

Here, an amplitude of the maximum point $M(2j-1)$ is represented by $y(2j-1)$, and an amplitude of the minimum point $M(2j)$ is represented by $y(2j)$. In addition, time corresponding to the maximum point $M(2j-1)$ is represented by $t(2j-1)$, and time corresponding to the minimum point $M(2j)$ is represented by $t(2j)$.

The correlation object determination unit 32 obtains a value $D(2j-1)$ of the first upper-limit rate of change at the time $t(2j-1)$ according to a relation of $D(2j-1)=y(2j-1)-y(2j-3)$. In other words, the correlation object determination unit 32 obtains a discrete value of the first upper-limit rate of change, as $D(3)=y(3)-y(1)$, $D(5)=y(5)-y(3)$, $D(7)=y(7)-y(5), \ldots$.

Further, the correlation object determination unit 32 obtains a value $D(2j)$ of the first lower-limit rate of change at the time $t(2j)$ according to a relation of $D(2j)=y(2j)-y(2j-2)$. In other words, the correlation object determination unit 32 obtains a discrete value of the first lower-limit rate of change, as $D(2)=y(2)-y(0)$, $D(4)=y(4)-y(2)$, $D(6)=y(6)-y(4), \ldots$.

The correlation object determination unit 32 obtains a first correlation object signal in which discrete values $D(3), D(5), D(7), \ldots$ of the first upper-limit rate of change discretely arranged on the time axis and discrete value $D(2), D(4), D(6), \ldots$ of the first lower-limit rate of change discretely arranged on the time axis are arranged on the same time axis. In other words, the discrete first correlation object signal is obtained as discrete value $D(2), D(3), D(4), D(5), D(6), \ldots$ on the time axis. The correlation object determination unit 32 stores the first correlation object signal, which is obtained in this manner, in the storage unit 42.

Figure 6:
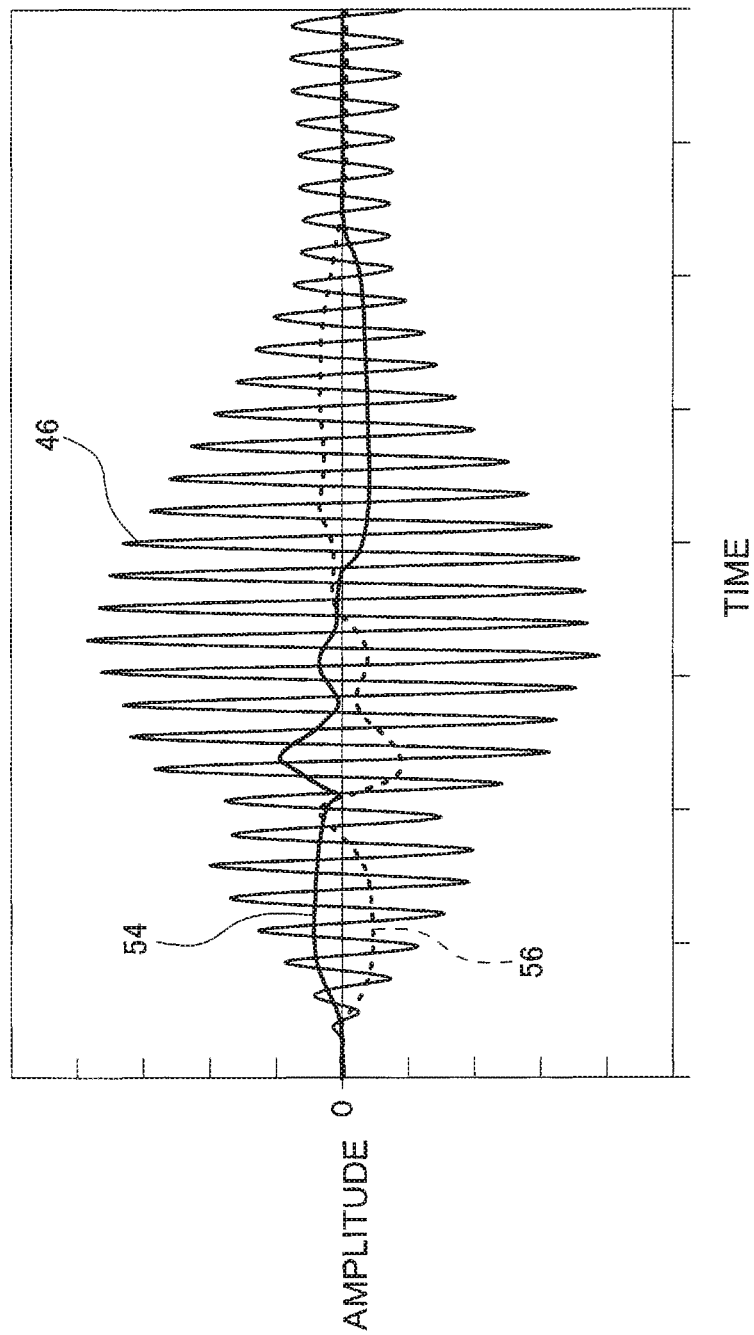
FIG. 6 is a diagram illustrating a direct wave signal, a first upper-limit rate of change, and a first lower-limit rate of change.
Figure 7:
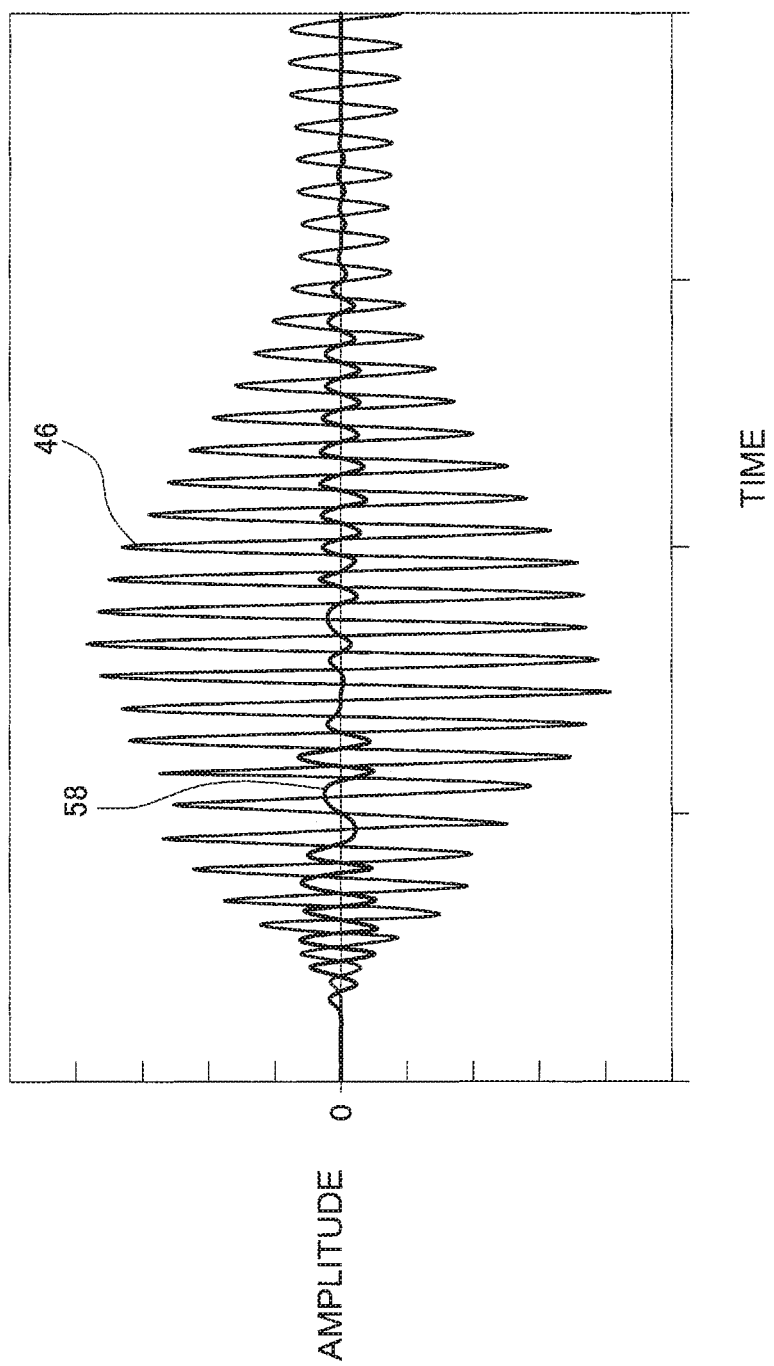
FIG. 7 is a diagram illustrating a direct wave signal and a first correlation object signal.

FIG. 6 illustrates a direct wave signal 46, a first upper-limit rate of change 54, and a first lower-limit rate of change 56. However, for the first upper-limit rate of change 54 and the first lower-limit rate of change 56, time waveforms obtained by interpolation of discrete values appear. FIG. 7 illustrates a direct wave signal 46 and a first correlation object signal 58. However, for the first correlation object signal 58, time waveforms obtained by interpolation of discrete values appear.

The correlation object determination unit 32 obtains a discrete second correlation object signal in such a manner that the one round-trip delay wave signal is also subjected to the same processing as that performed on the direct wave signal. In other words, the correlation object determination unit 32 obtains a differential waveform of an upper-limit envelope connecting maximum points of the time waveforms of the one round-trip delay wave signal, as a second upper-limit rate of change. In addition, the correlation object determination unit 32 obtains a differential waveform of a lower-limit envelope connecting minimum points of the time waveforms of the one round-trip delay wave signal, as a second lower-limit rate of change. Further, the correlation object determination unit 32 obtains a second correlation object signal, which is a signal for obtaining a time difference between the direct wave signal and the one round-trip delay wave signal, based on the second upper-limit rate of change and the second lower-limit rate of change, and stores the obtained signal in the storage unit 42.

As described above, the correlation object determination unit 32: obtains the difference between the maximum values adjacent to each other on the time axis to obtain the discrete first upper-limit rate of change arranged in time series and the discrete second upper-limit rate of change arranged in time series; obtains the difference between the minimum values adjacent to each other on the time axis to obtain the discrete first lower-limit rate of change arranged in time series and the discrete second lower-limit rate of change arranged in time series; obtains the first correlation object signal by arranging, in a time-series order, the discrete first upper-limit rate of change arranged in time series and the discrete first lower-limit rate of change arranged in time series, and stores the obtained first correlation object signal in the storage unit 42; and obtains the second correlation object signal by arranging, in a time-series order, the discrete second upper-limit rate of change arranged in time series and the discrete second lower-limit rate of change arranged in time series, and stores storing the obtained second correlation object signal in the storage unit 42.

The correlation processing unit 34 reads the discrete values of the first correlation object signal and the second correlation object signal stored in the storage unit 42. The correlation processing unit 34 may execute interpolation processing on the discrete values of the first correlation object signal and the second correlation object signal to increase the discrete values on the time axis.

The correlation processing unit 34 obtains a correlation value between the first correlation object signal and a sliding second correlation object signal obtained by advancing the second correlation object signal by a sliding time ts on the time axis. In other words, the sliding second correlation object signal is a signal obtained by moving the second correlation object signal in a negative direction on the time axis by the sliding time ts on the time axis. Here, the correlation value is a value indicating a degree of approximation of the time waveforms of two signals. The correlation value is normalized so that the maximum value of the absolute value thereof is 1, and takes a value of −1 or more and 1 or less. As the time waveforms of the two signals are approximate to each other, the absolute value of the correlation value becomes close to 1.

The correlation processing unit 34 has a function as a propagation time measurement unit, obtains a correlation value while changing the sliding time ts and obtains, as a propagation time tp, a value of the sliding time ts, at which the correlation value becomes maximum, divided by 2. The propagation time tp is a time required for the ultrasonic waves to propagate over the distance from the transmission transducer 16 to the reception transducer 18 through the reflecting surface 24.

As described above, the gas concentration measurement device is configured by the propagation time measurement machine that obtains the propagation time required for the ultrasonic waves to propagate over the distance from the transmission transducer 16 to the reception transducer 18 through the reflecting surface 24 of the housing 10, based on the difference between the time at which the direct waves are received by the reception transducer 18 and the time at which the one round-trip delay waves are received by the reception transducer 18.

The storage unit 42 stores a propagation distance d0. The propagation distance d0 is a value obtained by measuring in advance the distance of the section where the ultrasonic waves reach the reflecting surface 24 of the housing 10 from the transmission transducer 16 and reach the reception transducer 18 from the reflecting surface 24. The concentration measurement unit 36 reads the propagation distance d0 from the storage unit 42, and divides the propagation distance d0 by the propagation time tp to obtain a propagation speed measurement value vm (=d0/tp). In addition, the concentration measurement unit 36 obtains a temperature measurement value Tm based on the value detected by the temperature sensor 26. The concentration measurement unit 36 obtains a hydrogen concentration p based on the following equation (Equation 1).

$$p = \frac{1}{M_h - M_a}(kRT_m/v_m^2 - M_a)$$ [Equation 1]

Here, k represents a specific heat ratio of a gas, R represents a gas constant, Mh represents a molecular weight of hydrogen, and Ma represents a molecular weight of air that does not contain hydrogen. Assuming that the composition of air to be measured consists only of 80% nitrogen and 20% oxygen, the specific heat ratio k may be 1.4. Further, the gas constant R is 8.31, the molecular weight Mh of hydrogen is 2.0, and the molecular weight Ma of air is 28.8. As described above, the propagation speed measurement value vm and the temperature measurement value Tm are obtained by the concentration measurement unit 36.

Since each value on the right side of Equation 1 is known, the concentration measurement unit 36 can obtain the hydrogen concentration p from Equation 1. The processor 28 outputs the obtained hydrogen concentration p from the connector 22 to an external computer. When the gas concentration measurement device includes a display panel, the processor 28 may display the hydrogen concentration p on the display panel.

In the gas concentration measurement device according to the embodiment, the differential waveform of the upper-limit envelope connecting the maximum points of the time waveforms of the direct wave signal is obtained as the first upper-limit rate of change, and the differential waveform of the lower-limit envelope connecting the minimum points of the time waveforms of the direct wave signal is obtained as the first lower-limit rate of change. Further, the first correlation object signal, in which the discrete values of the first upper-limit rate of change and the first lower-limit rate of change are arranged on the time axis, is obtained. In the gas concentration measurement device according to the embodiment, similarly, the differential waveform of the upper-limit envelope connecting the maximum points of the time waveforms of the one round-trip delay wave signal is obtained as the second upper-limit rate of change, and the differential waveform of the lower-limit envelope connecting the minimum points of the time waveforms of the one round-trip delay wave signal is obtained as the second lower-limit rate of change. Further, the second correlation object signal, in which the discrete values of the second upper-limit rate of change and the second lower-limit rate of change are arranged on the time axis, is obtained. Then, the correlation value between the first correlation object signal and the signal obtained by advancing the second correlation object signal by the sliding time ts is obtained, and the time half of the sliding time ts at which the correlation value becomes maximum is obtained as the propagation time tp.

According to such processing, the first correlation object signal and the second correlation object signal are not the amplitudes of the direct waves and the one-time round-trip delay wave, but are signals according to the time rate of change of the envelope. Therefore, a peak of the correlation value when the sliding time ts is changed becomes sharp compared with a case of obtaining a correlation value between a direct wave signal having a gradual amplitude change and a signal obtained by advancing a one round-trip delay wave signal having a gradual amplitude change by a sliding time ts. Thus, measurement accuracy of the propagation time tp is improved, and measurement accuracy of the gas concentration is improved.

The propagation time is measured based on the difference between the times at which the direct waves and the one round-trip delay waves are respectively received by the reception transducer 18. For this reason, the influence of the delay time on the measurement value in the transmission circuit 38, the transmission transducer 16, the reception transducer 18, and the reception circuit 40 is canceled out.

Further, even when the waveforms of the direct waves and the one round-trip delay waves collapse due to measurement conditions, for example, density and temperature of the gas, the collapse of the waveforms similarly occurs in both the direct waves and the one round-trip delay waves. Therefore, the influence of the collapse of the waveforms on the correlation value is small, and a measurement error due to a change in measurement conditions is reduced.

Figure 8:
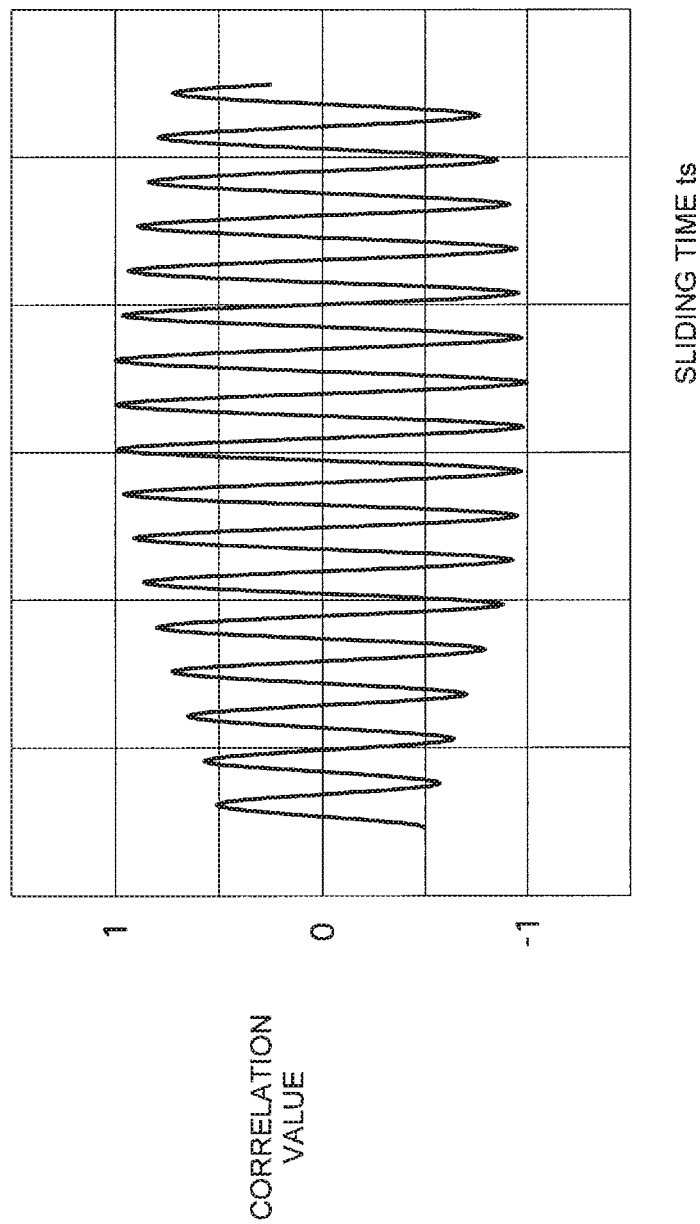
FIG. 8 is a diagram illustrating a correlation value between a direct wave signal and a signal obtained by advancing one round-trip delay wave signal by a sliding time ts.
Figure 9:
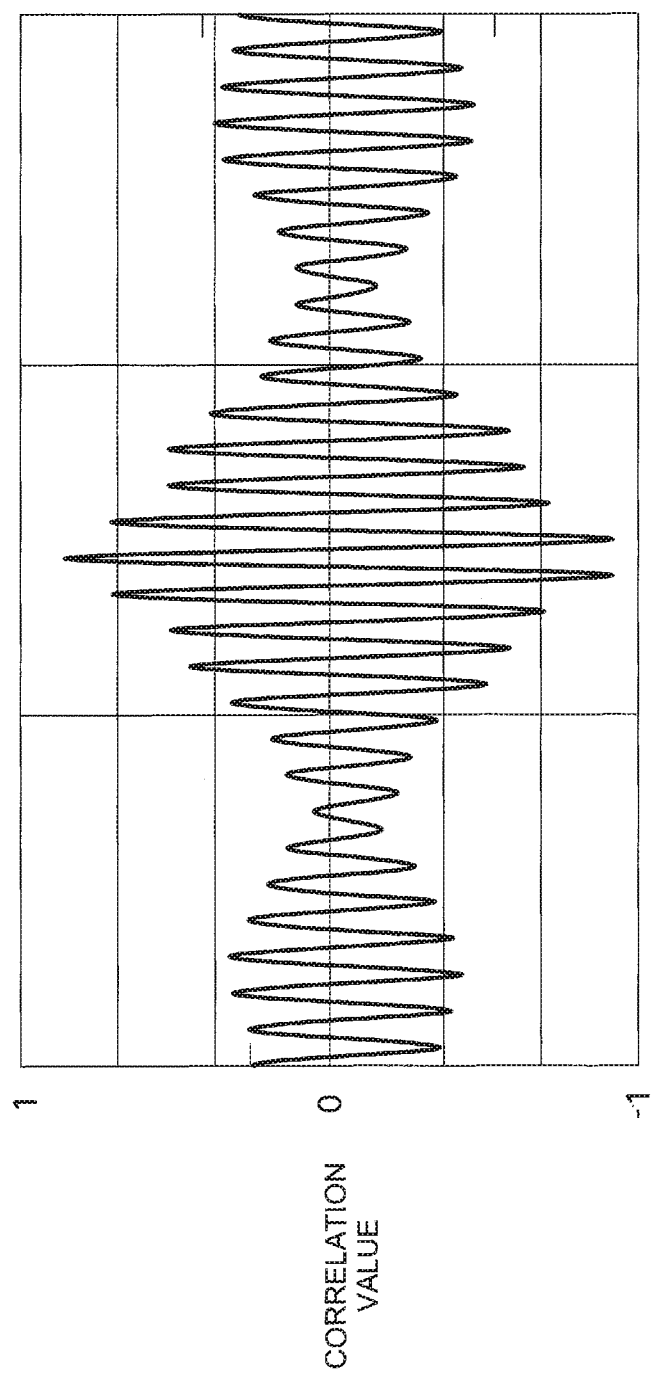
FIG. 9 is a diagram illustrating a correlation value between a first correlation object signal and a sliding second correlation object signal.

FIG. 8 illustrates a correlation value between the direct wave signal and the signal obtained by advancing the one round-trip delay wave signal by the sliding time ts. A horizontal axis indicates the sliding time ts, and a vertical axis indicates the correlation value. FIG. 9 illustrates a correlation value between the first correlation object signal and the sliding second correlation object signal. A horizontal axis indicates the sliding time ts, and a vertical axis indicates the correlation value. A change in a peak value with respect to the change in the sliding time ts is larger in the correlation value illustrated in FIG. 9 than in the correlation value illustrated in FIG. 8. It is also clear from these drawings that the measurement accuracy of the propagation time tp and the measurement accuracy of the gas concentration are improved by the processing according to the embodiment.

In the above-described embodiment, the processing is described in which the propagation time required for the ultrasonic waves to propagate over the distance from the transmission transducer 16 to the reception transducer 18 through the reflecting surface 24 is obtained using the correlation value between the direct wave signal and the one round-trip delay wave signal, and the hydrogen concentration is measured from the propagation time. Using the correlation value between the direct wave signal and the N round-trip delay wave signal, an N-fold time of the propagation time (N-fold propagation time) may be obtained, and the hydrogen concentration may be measured from the N-fold propagation time. In this case, the propagation speed measurement value vm may be obtained by dividing N-fold propagation distance d0 by the N-fold propagation time, and the hydrogen concentration may be measured using the propagation speed measurement value vm. Further, a time N-M-fold of the propagation time (N-M-fold propagation time) may be obtained using a correlation value between an N round-trip delay wave signal and an N-M round-trip delay wave signal, and a hydrogen concentration may be measured from the N-M-fold propagation time. Note that N is an integer of 2 or more, M is an integer of 1 or more, and a relation of N>M is satisfied. In this case, the propagation speed measurement value vm may be obtained by dividing N-M-fold propagation distance d0 by the N-M-fold propagation time, and the hydrogen concentration may be measured using the propagation speed measurement value vm.

FIG. 10 illustrates an example of a transmission pulse signal generated by the transmission circuit 38 under control of the transmission/reception control unit 30. A horizontal axis indicates a time, and a vertical axis indicates an amplitude. The transmission pulse signal is a differential signal formed by a pair of a positive signal and a negative signal. An ultrasonic pulse transmitted from the transmission transducer 16 is based on a signal from which a DC component is removed by subtracting the negative signal from the positive signal. A positive signal of a rectangular wave corresponding to five cycles from time t0 is generated, and a rectangular wave having an antiphase is generated as a positive signal over three cycles at time t1 after five cycles from the time t0. A level of a negative signal is 0 from the time t0 to the time t1. Then, a negative signal of a rectangular wave corresponding to three cycles is generated after the time t1. After the time t1, the negative signal has a reverse polarity to the positive signal. According to such a transmission pulse signal, ultrasonic waves whose phase is inverted and amplitude is increased in a sixth cycle are transmitted from the transmission transducer 16. Thus, ultrasonic waves having a large temporal rate of change of the envelope are received by the reception transducer 18, and a peak of the correlation value between the first correlation object signal and the sliding second correlation object signal becomes sharp. Accordingly, the measurement accuracy of the propagation time tp is improved, and the measurement accuracy of the gas concentration is improved.

Here, the description has been given with respect to the transmission pulse signal in which the positive phase signal of the five cycles is followed by the negative phase signal of the three cycles. The number of cycles of the positive phase signal (the number of repetitions) and the number of cycles of the negative phase signal are arbitrary. Further, the amplitude of the negative phase signal may be equal to the amplitude of the positive phase signal, or may be different from the amplitude of the positive phase signal. In other words, the amplitude of the negative phase signal does not need to be twice the amplitude of the positive phase signal, and may be an arbitrary magnitude. Further, the frequency of the negative phase signal may be different from the frequency of the positive phase signal.

In the above-described embodiment, the description has been given with respect to the configuration in which the transmission transducer 16 and the reception transducer 18 are separately provided. These ultrasonic transducers may be combined. In other words, a configuration in which one common ultrasonic transducer is connected to the transmission circuit 38 and the reception circuit 40 may be employed, and the ultrasonic transducer may transmit and receive ultrasonic waves.

Figure 11:
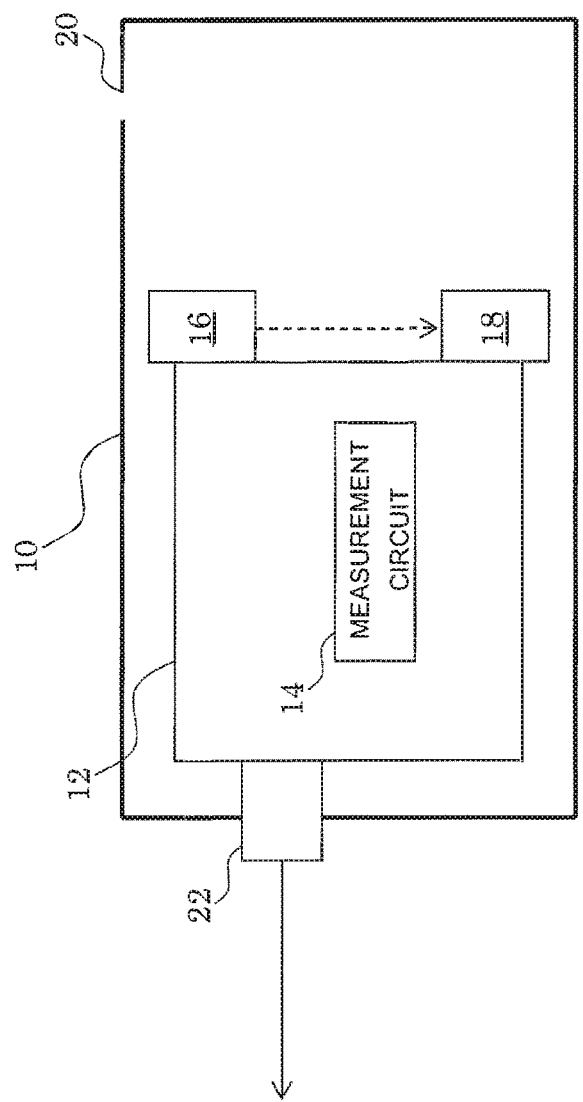
FIG. 11 is a diagram illustrating a modification of a gas concentration measurement device.

In the above-described embodiment, the description has been given with respect to the structure in which the ultrasonic waves are transmitted from the transmission transducer 16 to the reflecting surface 24 of the housing 10 and the ultrasonic waves reflected by the reflecting surface 24 of the housing 10 are received by the reception transducer 18. In addition to such a structure, as illustrated in FIG. 11, a structure may be employed in which the transmission transducer 16 and the reception transducer 18 face each other. In this case, the ultrasonic waves transmitted from the transmission transducer 16 and propagating in the housing 10 are received by the reception transducer 18. The reception transducer 18 receives ultrasonic waves transmitted from the transmission transducer 16 and directly reaching the reception transducer 18 as direct waves. In addition, the reception transducer 18 receives ultrasonic waves transmitted from the transmission transducer 16, returning to the transmission transducer 16 by reflection on the reception transducer 18, and reaching the reception transducer 18 again by reflection on the transmission transducer 16, as one round-trip delay waves. Further, the reception transducer 18 receives ultrasonic waves transmitted from the transmission transducer 16, and propagating N times along a round-trip route in which the ultrasonic waves return to the transmission transducer 16 by reflection on the reception transducer 18 and reach the reception transducer 18 again, as N round-trip delay waves.

In the above-described embodiment, the description has been given with respect to the gas concentration measurement device for measuring the hydrogen concentration. The gas concentration measurement device may be used to measure a concentration of other gases. In this case, processing is executed in a state where the specific heat ratio k, the number of molecules, and the like in Equation 1 are replaced with values of the gas to be measured.

REFERENCE SIGNS LIST 10 housing
12 circuit board
14 measurement circuit
16 transmission transducer
18 reception transducer
20 vent hole
22 connector
24 reflecting surface
26 temperature sensor
28 processor
30 transmission/reception control unit
32 correlation object determination unit
34 correlation processing unit
36 concentration measurement unit
38 transmission circuit
40 reception circuit
42 storage unit
46 direct wave signal
48 one round-trip delay wave signal
50 upper-limit envelope
52 lower-limit envelope
54 first upper-limit rate of change
56 first lower-limit rate of change
58 first correlation object signal

The invention claimed is:

1. A propagation time measurement machine, comprising:
a reception unit that receives ultrasonic waves; and
a computation unit that obtains a time required for the ultrasonic waves to propagate in a measurement space, based on a first reception signal output from the reception unit based on first ultrasonic waves received by the reception unit, and a second reception signal output subsequent to the first ultrasonic waves from the reception unit based on second ultrasonic waves received by the reception unit,
the computation unit including:
a correlation object determination unit that obtains a first correlation object signal obtained based on a first upper-limit rate of change, which is a rate of change of an upper-limit envelope of the first reception signal, and a first lower-limit rate of change, which is a rate of change of a lower-limit envelope of the first reception signal, and a second correlation object signal obtained based on a second upper-limit rate of change, which is a rate of change of an upper-limit envelope of the second reception signal, and a second lower-limit rate of change, which is a rate of change of a lower-limit envelope of the second reception signal;
a correlation processing unit that obtains a correlation value between the first correlation object signal and a signal obtained by moving the second correlation object signal on a time axis; and
a propagation time measurement unit that obtains a time difference between the first correlation object signal and the second correlation object signal based on the correlation value, and obtains the time required for the ultrasonic waves to propagate in the measurement space, based on the time difference.

2. The propagation time measurement machine according to claim 1, wherein the correlation object determination unit is configured to:

obtain a difference between maximum values adjacent to each other on the time axis to obtain the discrete first upper-limit rate of change arranged in time series and the discrete second upper-limit rate of change arranged in time series;
obtain a difference between minimum values adjacent to each other on the time axis to obtain the discrete first lower-limit rate of change arranged in time series and the discrete second lower-limit rate of change arranged in time series;
arrange, in time-series order, the discrete first upper-limit rate of change arranged in time series and the discrete first lower-limit rate of change arranged in time series, to obtain the first correlation object signal; and
arrange, in time-series order, the discrete second upper-limit rate of change arranged in time series and the discrete second lower-limit rate of change arranged in time series, to obtain the second correlation object signal.

3. A gas concentration measurement device, comprising:
the propagation time measurement machine according to claim 1; and
a concentration measurement unit that measures a concentration of a specific gas in the measurement space, based on the time required for the ultrasonic waves to propagate in the measurement space.

4. A non-transitory computer readable information storage medium having stored thereon instructions readable by a propagation time measurement machine including: a reception unit that receives ultrasonic waves; and a computation unit that obtains a time required for the ultrasonic waves to propagate in a predetermined measurement space, based on a first reception signal output from the reception unit based on first ultrasonic waves received by the reception unit, and a second reception signal output subsequent to the first ultrasonic waves from the reception unit based on second ultrasonic waves received by the reception unit, instructions causing the computation unit to perform the following steps:
correlation object determination processing for obtaining a first correlation object signal obtained based on a first upper-limit rate of change, which is a rate of change of an upper-limit envelope of the first reception signal, and a first lower-limit rate of change, which is a rate of change of a lower-limit envelope of the first reception signal, and a second correlation object signal obtained based on a second upper-limit rate of change, which is a rate of change of an upper-limit envelope of the second reception signal, and a second lower-limit rate of change, which is a rate of change of a lower-limit envelope of the second reception signal;
correlation processing for obtaining a correlation value between the first correlation object signal and a signal obtained by moving the second correlation object signal on a time axis; and
propagation time measurement processing for obtaining a time difference between the first correlation object signal and the second correlation object signal based on the correlation value, and obtaining the time required for the ultrasonic waves to propagate in the measurement space, based on the time difference.

5. The non-transitory computer readable information storage medium according to claim 4, wherein the correlation object determination processing includes:
processing for obtaining a difference between maximum values adjacent to each other on the time axis to obtain the discrete first upper-limit rate of change arranged in time series and the discrete second upper-limit rate of change arranged in time series;

processing for obtaining a difference between minimum values adjacent to each other on the time axis to obtain the discrete first lower-limit rate of change arranged in time series and the discrete second lower-limit rate of change arranged in time series;

processing for arranging, in time-series order, the discrete first upper-limit rate of change arranged in time series and the discrete first lower-limit rate of change arranged in time series, to obtain the first correlation object signal; and processing for arranging, in time-series order, the discrete second upper-limit rate of change arranged in time series and the discrete second lower-limit rate of change arranged in time series, to obtain the second correlation object signal.

6. A propagation time measurement method to be executed by a propagation time measurement machine including; a reception unit that receives ultrasonic waves; and a computation unit that obtains a time required for the ultrasonic waves to propagate in a predetermined measurement space, based on a first reception signal output from the reception unit based on first ultrasonic waves received by the reception unit, and a second reception signal output subsequent to the first ultrasonic waves from the reception unit based on second ultrasonic waves received by the reception unit, the propagation time measurement method causing the computation unit to execute processing of:

correlation object determination processing for obtaining a first correlation object signal obtained based on a first upper-limit rate of change, which is a rate of change of an upper-limit envelope of the first reception signal, and a first lower-limit rate of change, which is a rate of change of a lower-limit envelope of the first reception signal,and a second correlation object signal obtained based on a second upper-limit rate of change, which is a rate of change of an upper-limit envelope of the second reception signal, and a second lower-limit rate of change, which is a rate of change of a lower-limit envelope of the second reception signal;

correlation processing for obtaining a correlation value between the first correlation object signal and a signal obtained by moving the second correlation object signal on a time axis; and propagation time measurement processing for obtaining a time difference between the first correlation object signal and the second correlation object signal based on the correlation value, and obtaining the time required for the ultrasonic waves to propagate in the measurement space, based on the time difference.

7. The propagation time measurement method according to claim 6, wherein the correlation object determination processing includes:

processing for obtaining a difference between maximum values adjacent to each other on the time axis to obtain the discrete first upper-limit rate of change arranged in time series and the discrete second upper-limit rate of change arranged in time series;

processing for obtaining a difference between minimum values adjacent to each other on the time axis to obtain the discrete first lower-limit rate of change arranged in time series and the discrete second lower-limit rate of change arranged in time series;

processing for arranging, in time-series order, the discrete first upper-limit rate of change arranged in time series and the discrete first lower-limit rate of change arranged in time series, to obtain the first correlation object signal; and processing for arranging, in time-series order, the discrete second upper-limit rate of change arranged in time series and the discrete second lower-limit rate of change arranged in time series, to obtain the second correlation object signal.

* * * * *